US008804572B2

(12) United States Patent
Kamath et al.

(10) Patent No.: US 8,804,572 B2
(45) Date of Patent: Aug. 12, 2014

(54) DISTRIBUTED SWITCH SYSTEMS IN A TRILL NETWORK

(75) Inventors: Dayavanti Gopal Kamath, Santa Clara, CA (US); Keshav Govind Kamble, Fremont, CA (US); Dar-Ren Leu, San Jose, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/280,802

(22) Filed: Oct. 25, 2011

(65) Prior Publication Data

US 2013/0100858 A1 Apr. 25, 2013

(51) Int. Cl.
*H04L 12/28* (2006.01)
*H04L 12/56* (2006.01)
*G06F 15/173* (2006.01)

(52) U.S. Cl.
USPC ............ 370/255; 370/392; 370/401; 709/238

(58) Field of Classification Search
USPC ........... 370/225–254, 389–401; 709/238–246
See application file for complete search history.

(56) References Cited

U.S. PATENT DOCUMENTS

| 7,450,527 | B2 | 11/2008 | Ashwood Smith | |
|---|---|---|---|---|
| 7,558,195 | B1 * | 7/2009 | Kuo et al. | 370/219 |
| 7,720,061 | B1 | 5/2010 | Krishnaswamy et al. | |
| 7,787,480 | B1 * | 8/2010 | Mehta et al. | 370/401 |
| 7,821,963 | B2 | 10/2010 | Guan | |
| 8,345,697 | B2 * | 1/2013 | Kotha et al. | 370/401 |
| 8,351,352 | B1 * | 1/2013 | Eastlake, III | 370/256 |
| 8,369,335 | B2 * | 2/2013 | Jha et al. | 370/392 |
| 8,446,914 | B2 * | 5/2013 | Cheng et al. | 370/401 |
| 2003/0112582 | A1 | 6/2003 | Sanders et al. | |
| 2007/0268830 | A1 | 11/2007 | Li et al. | |
| 2008/0089247 | A1 | 4/2008 | Sane et al. | |
| 2008/0159277 | A1 * | 7/2008 | Vobbilisetty et al. | 370/357 |
| 2008/0259555 | A1 | 10/2008 | Bechtolsheim et al. | |
| 2009/0310610 | A1 | 12/2009 | Sandstrom | |
| 2010/0061394 | A1 | 3/2010 | Sindhu et al. | |
| 2010/0165995 | A1 | 7/2010 | Mehta et al. | |
| 2010/0246388 | A1 | 9/2010 | Gupta et al. | |
| 2010/0284418 | A1 | 11/2010 | Gray et al. | |
| 2011/0019552 | A1 | 1/2011 | Karaoguz et al. | |
| 2011/0019671 | A1 | 1/2011 | White et al. | |
| 2011/0019678 | A1 | 1/2011 | Mehta et al. | |
| 2011/0134925 | A1 | 6/2011 | Safrai et al. | |
| 2011/0268120 | A1 * | 11/2011 | Vobbilisetty et al. | 370/392 |
| 2011/0268125 | A1 * | 11/2011 | Vobbilisetty et al. | 370/395.53 |
| 2012/0243539 | A1 * | 9/2012 | Keesara | 370/392 |

OTHER PUBLICATIONS

Varis, Nuutti; "Minimizing ARP Broadcasting in TRILL"; Nov. 30-Dec. 4, 2009; 2009 IEEE Globecom Workshops; pp. 1-6.

(Continued)

*Primary Examiner* — Man Phan
(74) *Attorney, Agent, or Firm* — Schmeiser, Olsen & Watts LLP

(57) ABSTRACT

Featured are a system and method for providing a distributed switch system (DSS) in a TRILL-compliant network. An ingress network device in the TRILL-compliant network provides data to a received packet. The data includes instructions related to a feature of the DSS. The instructions are inserted into a TRILL header generated at the ingress network device. The TRILL header is output to an egress network device in the TRILL-compliant network. A determination is made whether the ingress network device and the egress network device are members of the DSS. The instructions are processed by the egress network device in response to determining that ingress and egress devices are members of the DSS.

20 Claims, 6 Drawing Sheets

(56) References Cited

OTHER PUBLICATIONS

Gray, Eric; "The Architecture of an RBridge Solution to TRILL"; Network Working Group Internet Draft ("work in progress"); Expires: May 2008; pp. 48 pages.

Eastlake, 3rd, Donald E.; "RBridge Traffic Aggregation and Compression"; Motorola, Inc.; Aug. 20, 2008; 5 pages.

Perlman, Radia et al; "Rbridges: Base Protocol Specification"; TRILL Working Group Internet-Draft (work in progress); Expires: Jul. 2007; 26 pages.

Srivatsavai, Rishi; "OpenSolaris TRILL"; TRILL design draft review; Jun. 24, 2009; 9 pages.

* cited by examiner

| DA | SA | E-TYPE | TRILL HDR | ORIG FRAME AND PAYLOAD | FCS |
|----|----|--------|-----------|------------------------|-----|

| IE | NC | TYPE | MT | LENGTH | VALUE |
|----|----|------|----|----|----|

| OUI | SUBTYPE | LENGTH | VALUE |
| 242 | 244 | 246 | 248 |

| OUI | TRUNKID | 2 | <trunk ID value> |
| 302 | 304 | 306 | 308 |

FIG. 3

DISTRIBUTED SWITCH SYSTEMS IN A TRILL NETWORK

FIELD OF THE INVENTION

The present inventive concepts relate generally to computer networks, and more particularly, to systems and methods for implementing a Transparent Interconnection of Lots of Links (TRILL) technology in a network comprising a distributed switch system.

BACKGROUND

A data center offering virtualization and cloud based services typically provides a commitment to its customers to support a large number of hosts. Challenges can arise as data centers become increasingly dynamic and corresponding port densities continue to increase. In particular, a deployment of server virtualization technologies in a data center requires sufficient network I/O bandwidth to satisfy the demand of virtualized applications and services.

SUMMARY

In one aspect, the invention features a method for providing a distributed switch system (DSS) in a TRILL-compliant network. The method comprises providing by an ingress network device in the TRILL-compliant network data to a received packet, the data including instructions related to a feature of the DSS. The instructions are inserted into a TRILL header generated at the ingress network device. The method comprises outputting the TRILL header to an egress network device in the TRILL-compliant network. The method comprises determining whether the ingress network device and the egress network device are members of the DSS. The method comprises processing the instructions by the egress network device in response to determining that ingress and egress devices are members of the DSS.

In another aspect, the inventive concepts feature a method for managing a plurality of network devices in a TRILL-compliant network to operate as a distributed switch system. The method comprises adding at an ingress network device a distributed switch parameter to a TRILL data packet. The method comprises outputting the TRILL data packet to an egress network device. The method comprises determining from the distributed switch parameter an instruction, wherein the egress network device is part of a same distributed switch as the ingress device. The egress network device complies with the instruction.

In another aspect, the inventive concepts feature a TRILL distributed switch system (DSS) bridge. The TRILL DSS bridge comprises an ingress Rbridge that provides data related to a feature of the DSS to a TRILL header that is added to a received packet to form a TRILL data packet and an egress Rbridge that receives the TRILL data packet and processes contents of the TRILL header for performing an operation dependent on an instruction provided in the contents by the ingress Rbridge.

In another aspect, the inventive concepts feature a computer program product for providing a distributed switch system (DSS) in a TRILL-compliant network The computer program product comprises a computer readable storage medium having computer readable program code embodied therewith. The computer readable program code comprises computer readable program code configured to provide by an ingress network device in the TRILL-compliant network data to a received packet, the data including instructions related to a feature of the DSS. The instructions are inserted into a TRILL header generated at the ingress network device. The computer readable program code comprises computer readable program code configured to output the TRILL header to an egress network device in the TRILL-compliant network. The computer readable program code comprises computer readable program code configured to determining whether the ingress network device and the egress network device are members of the DSS. The computer readable program code comprises computer readable program code configured to process the instructions by the egress network device in response to determining that ingress and egress devices are members of the DSS.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 2A is a diagram illustrating an Ethernet frame encapsulating a TRILL header, in accordance with an embodiment;

FIG. 2B is a diagram illustrating a TRILL TLV, in accordance with an embodiment;

FIG. 2C is a diagram illustrating an organizationally unique identifier (OUI) TLV, in accordance with an embodiment;

FIG. 3 is an illustrative example of an OUI TLV of FIG. 2C, in accordance with an embodiment;

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Data center infrastructures provide an ever-increasing number of Ethernet ports for connecting many thousands of servers, which are required to run modern applications used by businesses. To address inherent scalability problems that may arise in an Ethernet network, TRILL can be applied. TRILL was designed as a way to overcome shortcomings of Ethernet's Spanning Tree Protocol, which doesn't use all of the available paths between switches, and exhibits slow performance in a large network environment, resulting in the network being susceptible to link failures. TRILL uses link state routing to map the network, discovering and calculating shortest paths between TRILL nodes called Routing Bridges, or Rbridges. This enables shortest-path multihop routing so users can build large-scale Ethernet and Fibre-Channel-over- Ethernet data center networks. Accordingly, Rbridges allow Ethernet networks to scale better with regard to the number of hosts in the network as well as improved bandwidth utilization. Thus, TRILL networks can be applied in large campus or layer 2 environments.

The present inventive concepts extend the features of the TRILL protocol for use in a distributed switch system (DSS), for example, in a data center environment offering distributed switching features. Here, TRILL is used to communicate a unique identifier to different nodes of a TRILL network so that they can join a DSS. In particular, a TRILL packet is provided that includes optional TLVs such as an OUI TLV for transmitting a trunk ID and/or other relevant information such as quality of service (QOS) parameters in order to implement a distributed stack. For example, TRILL optional TLVs can be used to discover and authenticate members of the distributed switch. When the packet reaches one or more of the Rbridges on which the trunk has been configured, a hash computation is synchronized among any switches participating in a same link aggregation group, for example, to ensure that the switches choose the same hash from a list of possible hashes. If an output port is determined to be local, then a decision can be made whether the packet is to be forwarded on the local port; otherwise it is dropped on the egress Rbridge. In a similar manner, many of the parameters determined by the ingress packet processing logic can be communicated in the TRILL header to the egress RBRIDGE such as QOS parameters, so that they can be applied at the egress bridge as if it were a distributed system.

Figure 1:
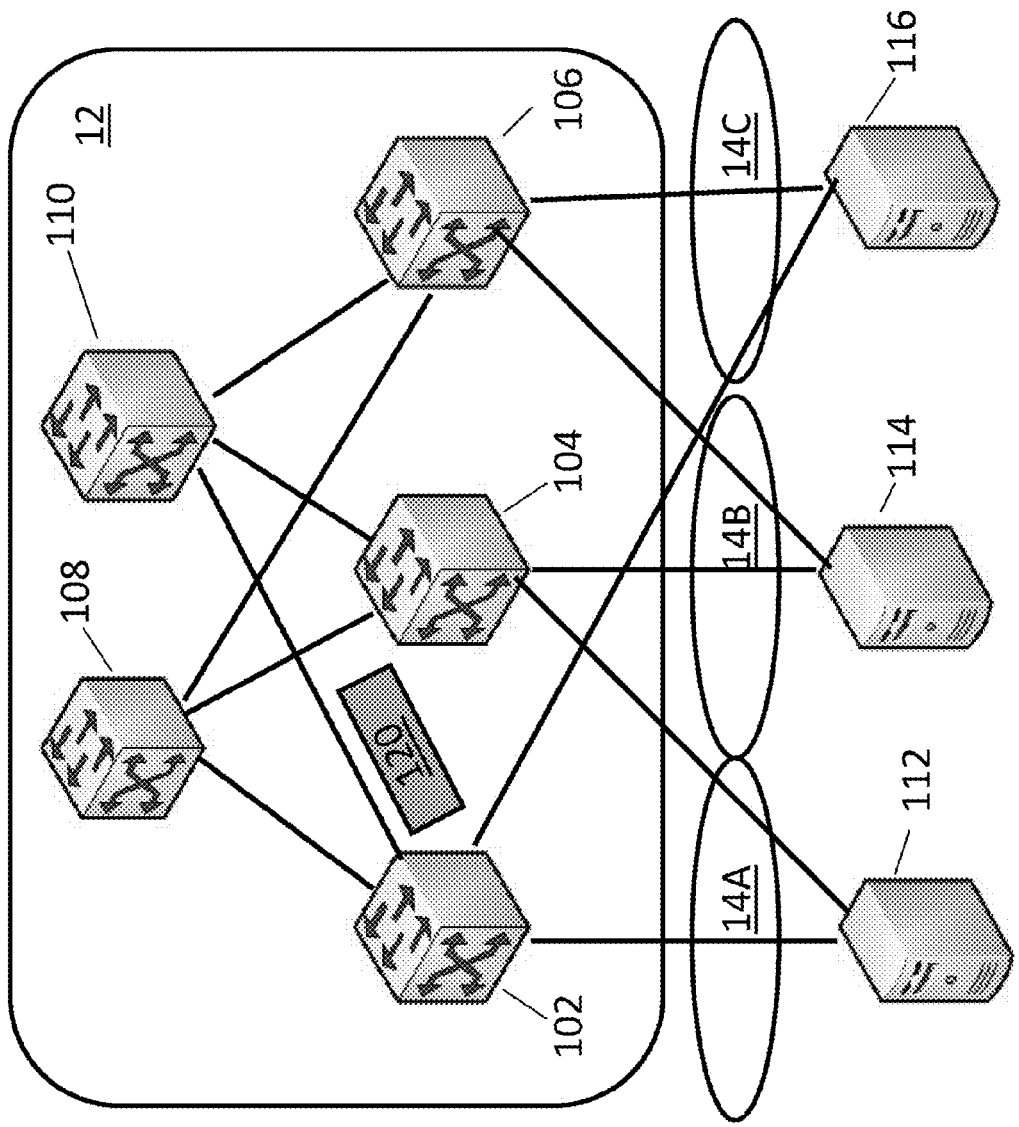
FIG. 1 is a block diagram of a TRILL environment in which embodiments of the present inventive concepts can be employed.

FIG. 1 is a block diagram of TRILL network environment 10 in which embodiments of the present inventive concepts can be employed. The TRILL network environment 10 can include one or more locations that serve as a computational, storage, and networking center for at least one organization. The equipment of the TRILL network environment 10 can reside together locally at a single site or can be distributed over two or more separate sites.

The TRILL network environment 10 can include one or more host computers 112, 114, 116, also referred to as end stations, in communication with a data center network 12 via a customer network 14A, 14B, 14C, respectively. In particular, a first end station 112 is in communication with a data center network 12 via a first customer network 14A, a second end station 114 is in communication with the data center network 12 via a second customer network 14B, and a third end station 116 is in communication with the data center network 12 via a third customer network 14C. The customer networks 14A-14C can be comprised of links aggregated using NIC teaming or the Link Aggregation Control Protocol (IEEE 802.1AX) or other appropriate technologies.

The host computers 112, 114, 116 can be an embodiment of a physical computing device, such as a server, a blade, a network device, and the like. The host computers 112, 114, 116 can reside alone or be installed in a chassis with other host computers, for example, in a rack server or a blade server.

The host computers 112, 114, 116 can run a virtualization system, which can include a hypervisor or a virtual machine manager (VMM). Alternatively, the host computers 112, 114, 116 can include a non-virtualized server or a server blade.

The data center network 12 includes a switch fabric comprising a plurality of switches 102, 104, 106, 108, 110. Although not shown, the data center network 12 can include one or more aggregator and gateway switches and/or other well-known data center equipment.

The switches 102, 104, 106, 108, 110 are configured as TRILL nodes, or Rbridges. The switches 102, 104, 106, 108, 110 can be organized into two or more racks, rows, and/or layers of switches in the switch fabric 12, or other well-known data center configuration. One such configuration is a mesh configuration, where a first layer of switches includes switches 102, 104, 106, and a second layer of switches includes switches 108 and 110. Each first layer edge switch 102, 104, 106, or Rbridge, is in communication with each second layer switch 108, 110, also referred to as a transit Rbridge, in a mesh configuration. Other configurations can equally apply, for example, a daisy-chain configuration. The switch fabric 12 can alternatively comprise a combination of Rbridges and non-compliant TRILL nodes, i.e., conventional switches. In a typical TRILL application, a TRILL packet encapsulated in an Ethernet frame includes a TRILL header and an outer Ethernet header. Thus, a destination MAC address is provided that is recognized by conventional switches and Rbridges alike for packet forwarding.

The switches 102, 104, 106, 108, 110 can be configured as a DSS. A DSS can include a plurality of switches or other network elements, each being an independent system running on its own CPU and network control plane. The network element can be an independent switch, or a line card, fabric card, or a management module in a physical chassis switch. The switches 102, 104, 106, 108, and 110 can be connected together to form a stacked switch, a virtual switch, or other distributed switch.

An operation will now be described where a data frame is transmitted from the host computer 112, referred to as a source host computer, to the host computer 116, and referred to as a destination host computer. The data frame is received by the first switch 102 in the data center network 12, referred to as an ingress Rbridge, which encapsulates the data frame with a TRILL header, which contains information such as instructions that permit one or more egress Rbridges, for example, switch 106 configured as an egress Rbridge, to be treated as part of a distributed system.

A TRILL frame 120 is generated at the ingress Rbridge 102, and output to one or more transit Rbridges, or intermediate Rbridges, for example, Rbridge 110, which can switch the received frame 120 to the egress Rbridge 106 by communicating according to a TRILL protocol.

FIG. 2A is a diagram illustrating an Ethernet frame 200 having a TRILL header 208, in accordance with an embodiment. The Ethernet frame 200 can be similar to or the same as the frame 120 of FIG. 1, or can other encapsulate some or all of the frame 120 of FIG. 1.

The Ethernet frame 200 includes a destination address field (DA) 202, a source address (SA) field 204, and a frame check sequence field 212 that are well-known Ethernet frame elements and will not be described for reasons related to brevity. The Ethertype field 206 is also well-known for indicating a header type, for example, an 802.1 frame.

The TRILL header 208 includes data determined by the ingress Rbridge 102 in the network and permitting the egress Rbridge 106 to be treated as though it is part of a distributed switch system. The TRILL header 208 includes a TRILL Ethertype field indicating the header type, i.e., TRILL. The TRILL header 208 includes a set of options, including TLV extensions, described in detail below. In particular, the TRILL frame 200 includes OUI TLVs and/or other optional TLVs used to discover and authenticate members of the distributed switch. The TRILL frame 200 can include TRILL end station address distribution instance (ESADI) protocol data used among DSS members, i.e., Rbridges, to communicate end station addresses to each other, for example, synchronizing MAC addresses.

FIG. 2B is a diagram illustrating a TRILL TLV 220, in accordance with an embodiment. The TRILL TLV 220 can be part of a TRILL header extension, for example, in the TRILL header 208 of FIG. 2A.

The TRILL TLV 220 includes an IE field 222, an NC field 224, a type field 226, an MT field 228, a length field 230, and a value field 232. The IE field includes a value determining an ingress egress (IE) extension. For example, a bit set in the IE field 222 for zero pertains to hop-by-hop extensions and set for one pertains to ingress-to-egress extensions. Hop-by-hop extensions are potentially applicable to every Rbridge that receives the frame. Ingress-to-egress extensions are inserted at the ingress Rbridge 102 and are applicable at the egress Rbridge 106. Ingress-to-egress extensions can be processed by transit Rbridges 108, 110. The NC field 224 can have a bit set to zero for critical extensions and set to one for non-critical (NC) extensions. The MT field 228 can have a bit set to zero for immutable extensions and set to one for mutable extensions. The type field 226 can constrain the values of the IE 222, NC 224, and MT 228 bits. For example, if these bits have a value not permitted by the extension Type field 226, the TLV can be ignored by the Rbridge. The length field 230 includes a value corresponding to a length of the extension value 232.

FIG. 2C is a diagram illustrating an OUI-specific TLV 240, in accordance with an embodiment. The OUI TLV 240 can be encoded in the TRILL header 208 using the optional headers feature. The OUI TLV 240 can include data used to implement a distributed switch, in particular, by communicating with the Rbridges 102, 104, 106, 108, 110 as part of a DSS.

The OUI TLV 240 includes an OUI field 242, a subtype field 244, a length field 246, and a value field 248. The OUI field 242 indicates that an OUI type, i.e., an organization specific TLV. The subtype field 244 includes a value provided by the ingress Rbridge 102. An illustrative example is a value indicating a common trunk ID which is communicated by the TRILL OUI TLV between the Rbridges of a single DSS. Other information provided in the subtype field 244 can include, but not limited to, a source DSS bridge, source port, virtual port, or trunk, destination DSS bridge, destination port, virtual port, trunk, or multicast index, packet classification, packet type, unicast, layer 2 multicast, layer 3 multicast, DLF or broadcast, control, internal packet priority, mirroring information, for example, to assist in mirroring the packet on another DSS port, ACL rule application information, QoS-related information, egress switch instructions, header modification instructions, drop precedence or DSCP modifications, and/or other ingress logic parsing information.

The length field 246 and the value field 248 are configured in a similar manner as any TLV, for example, the value field 248 including a value corresponding to the subtype field.

FIG. 3 is an illustrative example of an OUI TLV of FIG. 2C, in accordance with an embodiment. The OUI field 302 indicates the type of TRILL TLV, i.e., an OUI TLV. The subtype field 304 includes a trunkID subtype. The length field 306 indicates a length of the value field 308 being 2 bytes. The value field 308 includes a trunk ID value.

The TRILL OUI TLV 300 can be used to communicate a common trunk id between all Rbridges 102-110 of a single DSS domain, so each egress Rbridge, e.g., Rbridge 106, can compute the same hash for the flow and send or drop the packets on the correct ports belonging to that trunk. During operation, each data packet carries the trunk id that has been determined from an L2 table lookup at the ingress Rbridge 102. When the packet reaches one or more of the Rbridges, e.g., Rbridge 106 on which the trunk has been configured, both compute the same hash on the flow, and if the port is local, the packet is forwarded, otherwise it is dropped on the egress Rbridge 106. In the DSS configuration, the hash computation can be distributed among the Rbridges in the DSS. If the hash computation and flow definition is synchronized between the switches participating in a link aggregation group, they can independently determine the same output port on the same flow. Once each switch, or Rbridge, learns an output port for the packet, the Rbridge can determine whether to forward it out on that port if that port is local, or otherwise drop the packet. Other parameters determined by the packet processing logic of the ingress Rbridge 102 can be communicated in the TRILL header to the egress RBRIDGE such as QOS parameters, so that they can be applied at the egress Rbridge 106 as if it is a distributed system.

Figure 4:
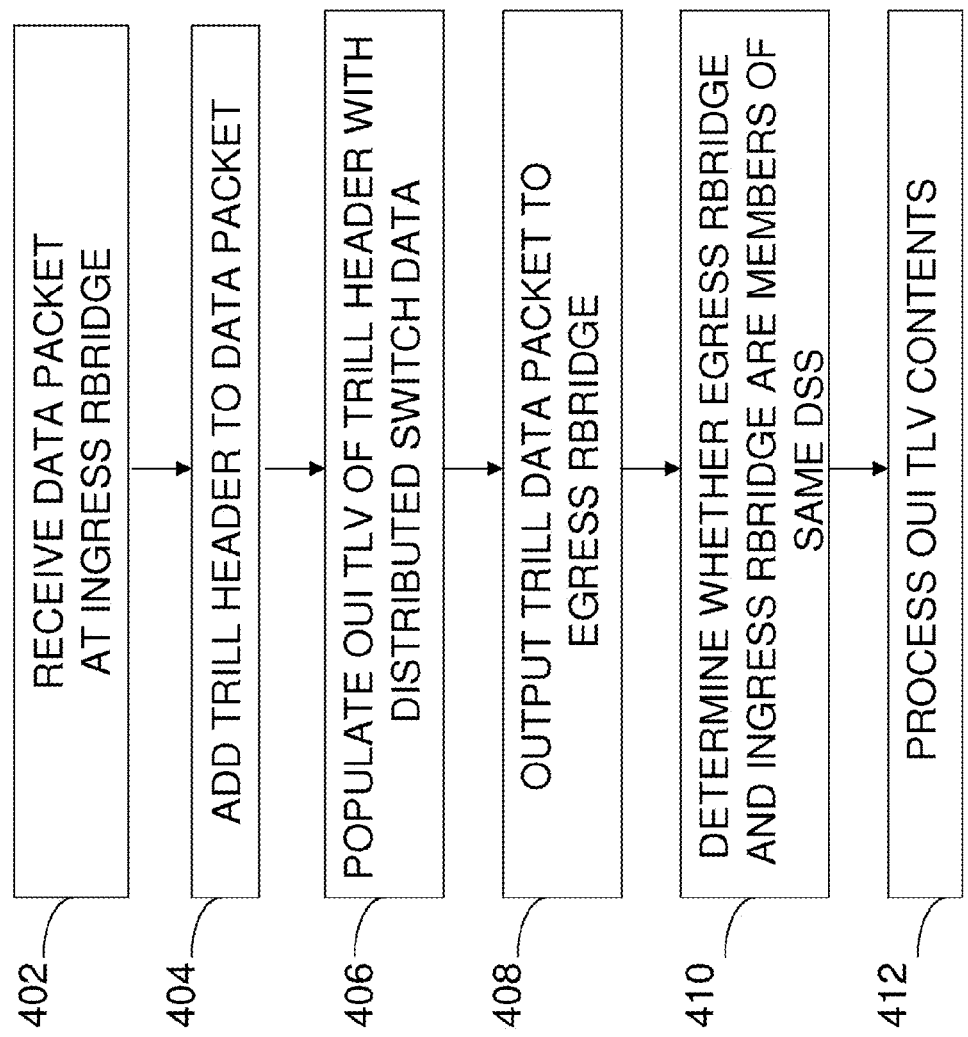
FIG. 4 is a flow diagram illustrating a method for managing a plurality of Rbridges in a TRILL-compliant network to operate as a distributed switch system, in accordance with an embodiment.

FIG. 4 is a flow diagram illustrating a method 400 for managing a plurality of Rbridges in a TRILL-compliant network to operate as a distributed switch system, in accordance with an embodiment, in accordance with an embodiment. In describing the method 400, reference is also made to elements of FIGS. 1-3. Some or all of the method 400 can be performed on one or more Rbridges and/or host computers, for example, described with reference to FIG. 1.

At step 402, a data packet is received at the ingress Rbridge 102, for example, from the first end station 112. The data packet can include the payload data 210 shown at FIG. 2.

At step 404, the ingress Rbridge 102 forms a TRILL data packet by adding a TRILL header 208 to the data packet. The TRILL header 208 includes an OUI TLV 240, which at step 406 is populated with distribution switch data, for example, a trunk ID described herein.

At step 408, the TRILL data packet is output to destination address identified in the TRILL data packet, for example, the egress Rbridge 106. The TRILL data packet can be received by one or more transit Rbridges, for example, Rbridge 110, prior to delivery to the egress Rbridge 106.

At step 410, a determination is made as to whether the ingress Rbridge 102 and the egress Rbridge 106 are members of the same DSS. The determination of which switches, i.e., Rbridge 102, 106 are on the same DSS can be made by each Rbridge sending a unique identifier associating the Rbridge with a DSS, and permitting the Rbridge to join the DSS membership. This identifier can be multicast using the TRILL OUI TLV 240 as part of the switch discovery process. If a determination is made that the ingress Rbridge 102 and the egress Rbridge 106 are indeed members of the same DSS, the egress Rbridge 106 can process the contents of the received TRILL OUI TLV 240, for example, complying with instructions provided in the TRILL OUI TLV 240. For example, the Rbridge 106 can determine QoS parameters, port or trunk information, and the like from the OUI TLV 240 shown in FIG. 2C. In this manner, the Rbridges 102, 106, and/or transit Rbridges can operate as a DSS. A user can be presented with a single switch system view by synchronizing the forwarding paths and a user interface at a computer (not shown) in communication with the DSS. The control plane of the network switches of the DSS can also be at least partially synchronized. Here, the switches can be managed as a single switch by the user.

Figure 5:
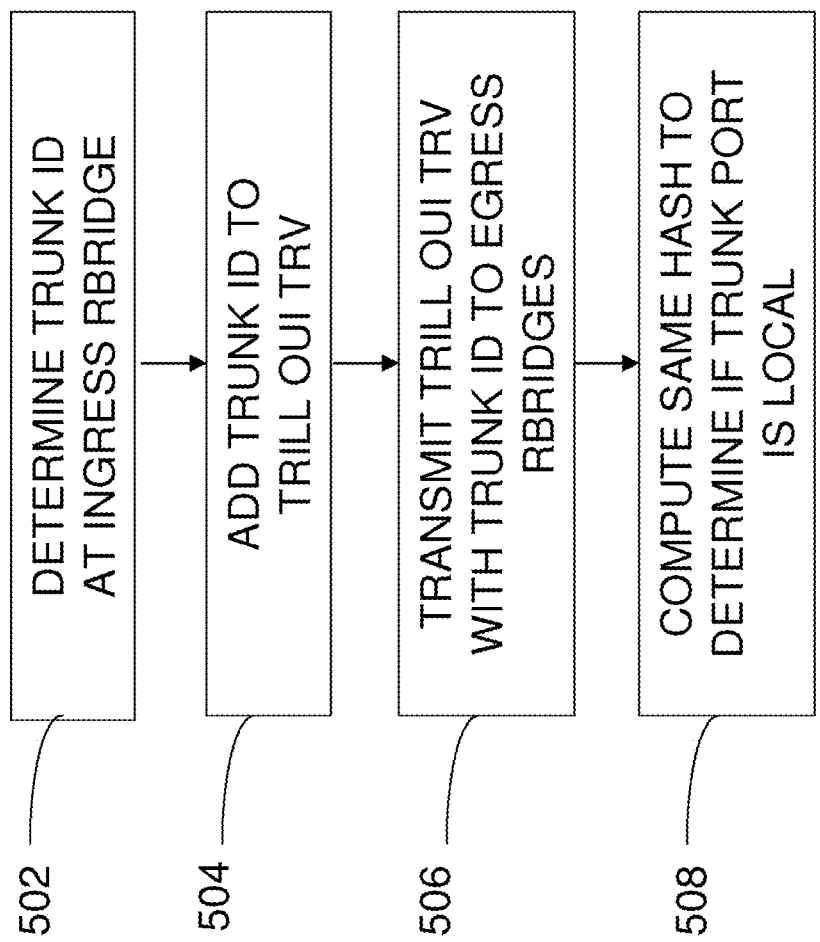
FIG. 5 is a flow diagram illustrating a method for processing distributed switch data in a TRILL-compliant network, in accordance with an embodiment.

FIG. 5 is a flow diagram illustrating a method 500 for processing distributed switch data in a TRILL-compliant network, in accordance with an embodiment. In describing the method 500, reference is also made to elements of FIGS. 1-4. Some or all of the method 500 can be performed on one or more Rbridges and/or host computers, for example, described with reference to FIG. 1.

At step 502, a trunk ID is determined at the ingress Rbridge 102. The trunk ID can be determined from a layer 2 table lookup at the ingress Rbridge 102.

At step 504, the trunk ID is added to the OUI TLV of a TRILL data packet, for example, as shown in FIG. 3.

At step 506, the TRILL OUI TLV is output to the egress Rbridge 106, which processes the contents of the TRILL OUI TLV, i.e., the trunk ID, when the egress Rbridge 106 is part of the same DSS as the ingress Rbridge 106. The TRILL OUI TLV can be distributed to a plurality of Rbridges, for example, all Rbridges which are part of a link aggregation group.

At step 508, a determination is made as to which trunk port the TRILL data packet is output. A hash computation can be distributed among the Rbridges in the DSS, for example, the Rbridges which are part of the same link aggregation group. Each Rbridge can independently determine a same output port on a same data flow. Once each Rbridge learns which port a packet of the data flow can be output, that Rbridge can determine whether to forward it via that port if that port is local, or otherwise drop the packet.

While FIG. 5 illustrates a trunk ID, any data related to a DSS can be provided, for example, a source DSS bridge, source port, virtual port, or trunk, other features related to base protocol forwarding, destination port, virtual port, trunk, or multicast index, packet classification, packet type, unicast, layer 2 multicast, layer 3 multicast, DLF or broadcast, control, internal packet priority, mirroring information, for example, to assist in mirroring the packet on another DSS port, ACL rule application information, QoS-related information, egress switch instructions, header modification instructions, drop precedence or DSCP modifications, and/or other ingress logic parsing information.

Figure 6:
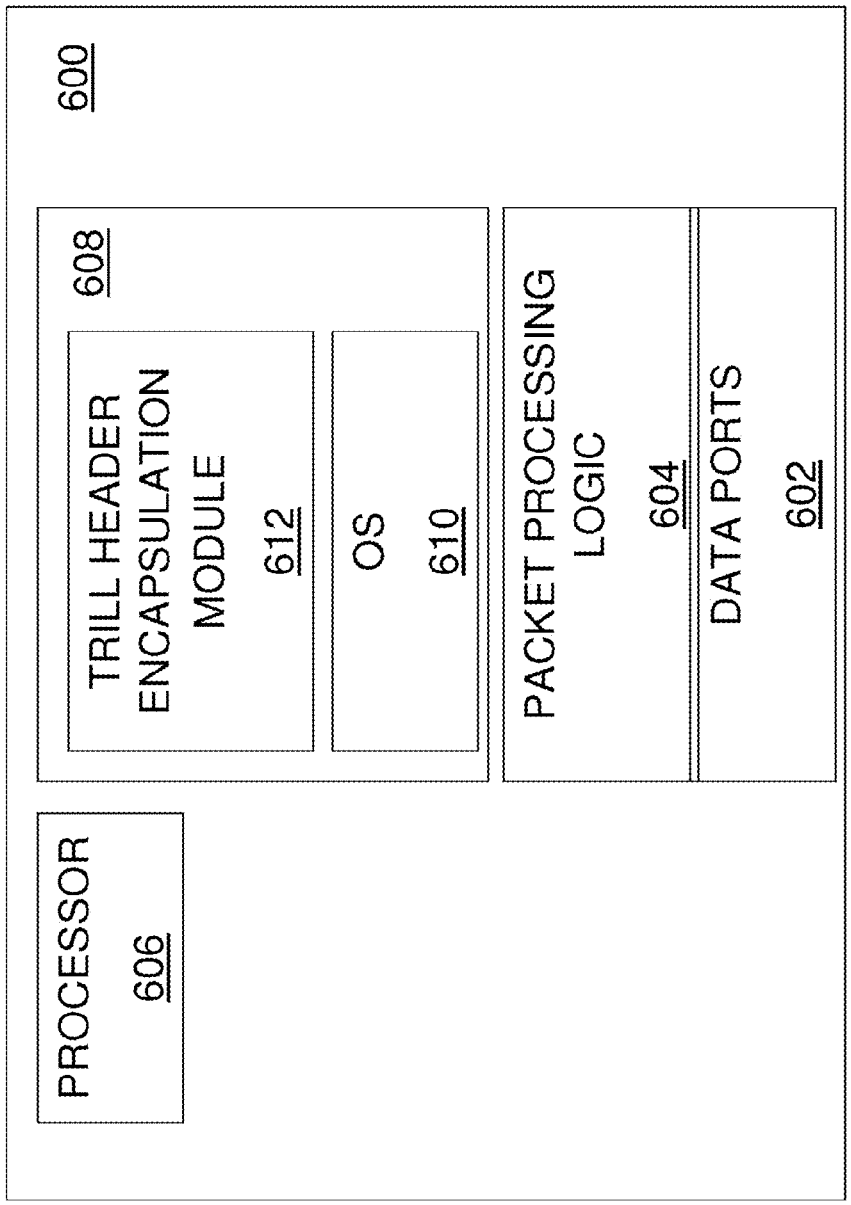
FIG. 6 is a block diagram of a switch, in accordance with an embodiment.

FIG. 6 is a block diagram of a switch 600, in accordance with an embodiment. The switch 600 includes a processor 606, a memory 608 having an operating system 610 and a TRILL header encapsulation module 612, packet processing logic 604, and a plurality of data ports 602 communicate with each other via a bus and/or data connector.

The data ports 602 can be connected to the network 14, for example, to communicate with other nodes, host computers, and so on. For example, the data ports 602 can be Gigabit or 10 GB Ethernet ports, for transmitting and receiving data, for example, data packets with other network devices.

The packet processing logic 604 can receive data frames and process their contents. The packet processing logic 604 can include application-specific integrated circuits (ASICs) or other hardware circuitry and features known to those of ordinary skill in the art. For example, the packet processing logic 604 can include ingress and egress logic for data plane processing, packet switching, and so on. Additional details of the packet processing features are known to those of ordinary skill in the art, and are omitted herein for reasons related to brevity.

The memory 608 can include volatile memory, for example, RAM and the like, and/or non-volatile memory, for example, ROM, flash memory, and the like. The memory can include removable and/or non-removable storage media implemented in accordance with methods and technologies known to those of ordinary skill in the art for storing data. Stored in the memory can include program code, such as program code of an operating system (OS) 610 executed by the processor 606, and/or program code corresponding to the TRILL header encapsulation module 612.

The TRILL header encapsulation module 612 generates a TRILL header, for example, described with reference to FIGS. 2A-2C, which includes data for implementing a distributed stack. Examples of the data added to the TRILL header are provided above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method for providing a distributed switch system (DSS) in a Transparent Interconnection of Lots of Links (TRILL)-compliant network, comprising:
   providing by an ingress network device in the TRILL-compliant network data to a received packet, the data including instructions related to a feature of the DSS, the instructions inserted into a TRILL header generated at the ingress network device;
   outputting the TRILL header to an egress network device in the TRILL-compliant network;
   determining whether the ingress network device and the egress network device are members of the DSS;
   synchronizing a hash computation of a data flow related to the TRILL header among network devices in the DSS that include the ingress network device and the egress network device for determining an output port for the data flow;
   processing the instructions by the egress network device in response to determining that ingress and egress devices are members of the DSS.

2. The method of claim 1, wherein the ingress network device and the egress network device each includes an Rbridge.

3. The method of claim 1, wherein the instructions include at least one DSS parameter.

4. The method of claim 3, further comprising communicating with at least one of the ingress network device, the egress network device, and one or more transit network devices, in accordance with the at least one DSS parameter.

5. The method of claim 1, further comprising presenting a single switch view response to processing the instructions.

6. The method of claim 1, wherein the TRILL header includes an Organizationally Unique Identifier type-length-value (OUI TLV) that is provided with data corresponding to the instructions.

7. The method of claim 1, wherein determining whether the ingress network device and the egress network device are members of the DSS includes exchanging a unique identifier between the ingress network device and the egress network device during a discovery process and the egress network device becomes a member of the DSS in response to receiving the unique identifier.

8. A method for managing a plurality of network devices in a Transparent Interconnection of Lots of Links (TRILL)-compliant network to operate as a distributed switch system, comprising:
   adding at an ingress network device a distributed switch parameter to a TRILL data packet;
   outputting the TRILL data packet to an egress network device; and
   determining from the distributed switch parameter an instruction, wherein the egress network device is part of a same distributed switch as the ingress device, and wherein the egress network device complies with the instruction, the method further comprising:
   synchronizing a hash computation of a data flow related to the TRILL data packet among network devices of the distributed switch that include the ingress network device and the egress network device for determining an output port for the data flow.

9. The method of claim 8, wherein the ingress network device and the egress network device each includes an Rbridge.

10. The method of claim 8, wherein the distributed switch is a distributed virtual switch.

11. The method of claim 8, further comprising communicating with at least one of the ingress network device, the egress network device, and one or more transit network devices as a distributed switch, in accordance with a DSS parameter.

12. The method of claim 8, further comprising presenting a single switch view in response to determining the instruction, the user managing the ingress network device and the egress network device as a single switch.

13. The method of claim 8, wherein the TRILL data packet comprises a header that includes an Organizationally Unique Identifier type-length-value (OUI TLV) that is provided with data corresponding to the instructions.

14. The method of claim 8, further comprising:
synchronizing the hash computation between network devices of the plurality of network devices, including the egress network device, the network devices participating in a same link aggregation group;
determining a common output port for a data flow from the TRILL data packet; and
determining by the network devices whether to output the data flow from a local output port belonging to a specified trunk.

15. The method of claim 14, wherein the distributed switch parameter includes a trunk identifier.

16. A Transparent Interconnection of Lots of Links (TRILL) distributed switch system (DSS), comprising:
an ingress Rbridge that provides data related to a feature of the DSS to a TRILL header that is added to a received packet to form a TRILL data packet; and
an egress Rbridge that receives the TRILL data packet and processes contents of the TRILL header for performing an operation dependent on an instruction provided in the contents by the ingress Rbridge, wherein the DSS synchronizes a hash computation of the data between the ingress Rbridge and the egress Rbridge for determining an output port for the data.

17. The DSS of claim 16 further comprising at least one transit Rbridge along a flow path of the TRILL data packet between the ingress Rbridge to the egress Rbridge.

18. The DSS of claim 16, wherein the egress Rbridge complies with the instruction in response to determining that the egress Rbridge and the ingress Rbridge are members of the DSS.

19. The DSS of claim 16, wherein the TRILL header includes an Organizationally Unique Identifier type-length-value (OUI TLV) that is provided with the TRILL header.

20. A computer program product for providing a distributed switch system (DSS) in a TRILL-compliant network, the computer program product comprising:
a computer readable storage medium having computer readable program code embodied therewith, the computer readable program code comprising;
computer readable program code configured to provide by an ingress network device in the TRILL-compliant network data to a received packet, the data including instructions related to a feature of the DSS, the instructions inserted into a TRILL header generated at the ingress network device;
computer readable program code configured to output the TRILL header to an egress network device in the TRILL-compliant network;
computer readable program code configured to determining whether the ingress network device and the egress network device are members of the DSS; and
computer readable program code configured to process the instructions by the egress network device in response to determining that ingress and egress devices are members of the DSS, wherein the DSS synchronizes a hash computation of the data between the ingress network device and the egress network device for determining an output port for the data.

* * * * *